(12) United States Patent
Gati et al.

(10) Patent No.: US 9,469,204 B2
(45) Date of Patent: Oct. 18, 2016

(54) DEVICE FOR CHARGING A BATTERY OF A MOTOR VEHICLE ON THE BASIS OF A SINGLE-PHASE POWER SUPPLY NETWORK, AND METHOD OF CONTROLLING THE DEVICE

(75) Inventors: Mehdi Gati, Sceaux (FR); Pedro Kvieska, Versailles (FR); Ahmed Ketfi-Cherif, Elancourt (FR)

(73) Assignee: RENAULT s.a.s., Boulogne-billancourt (FR)

( * ) Notice: Subject to any disclaimer, the term of this patent is extended or adjusted under 35 U.S.C. 154(b) by 347 days.

(21) Appl. No.: 14/111,925

(22) PCT Filed: Apr. 12, 2012

(86) PCT No.: PCT/FR2012/050806
§ 371 (c)(1),
(2), (4) Date: Mar. 25, 2014

(87) PCT Pub. No.: WO2012/140374
PCT Pub. Date: Oct. 18, 2012

(65) Prior Publication Data
US 2014/0197788 A1    Jul. 17, 2014

(30) Foreign Application Priority Data

Apr. 14, 2011 (FR) ...................................... 11 01177

(51) Int. Cl.
| | |
|---|---|
| H02J 7/00 | (2006.01) |
| B60L 11/18 | (2006.01) |
| H02J 7/02 | (2016.01) |
| H02M 1/42 | (2007.01) |
| B60L 3/00 | (2006.01) |
| H02M 1/00 | (2006.01) |

(52) U.S. Cl.
CPC .......... B60L 11/1814 (2013.01); B60L 3/0092 (2013.01); B60L 11/1812 (2013.01); H02J 7/0052 (2013.01); H02J 7/022 (2013.01); H02M 1/4208 (2013.01); H02M 2001/007 (2013.01); Y02T 10/7005 (2013.01); Y02T 10/7072 (2013.01); Y02T 10/92 (2013.01); Y02T 90/127 (2013.01); Y02T 90/14 (2013.01)

(58) Field of Classification Search
CPC ........... H02J 7/022; H02J 7/005; H02J 7/008
USPC ....................................................... 320/109
See application file for complete search history.

(56) References Cited

U.S. PATENT DOCUMENTS

| | | | |
|---|---|---|---|
| 7,009,367 B1 * | 3/2006 | Sakurai ......................... | 323/222 |
| 8,198,881 B2 * | 6/2012 | Tsukamoto ................... | 323/288 |

(Continued)

FOREIGN PATENT DOCUMENTS

| | | |
|---|---|---|
| FR | 2 937 803 | 4/2010 |
| FR | 2 943 188 | 9/2010 |

OTHER PUBLICATIONS

International Search Report Issued Aug. 29, 2012 in PCT/FR12/50806 Filed Apr. 12, 2012.
French Search Report Issued Jan. 30, 2012 in French Application 1101177 Filed Apr. 14, 2011.

*Primary Examiner* — Suchin Parihar
(74) *Attorney, Agent, or Firm* — Oblon, McClelland, Maier & Neustadt, L.L.P.

(57) ABSTRACT

A device for charging a battery, for example of an electric traction motor vehicle, based on a single-phase power supply network, the device including a filtering stage configured to be connected to the single-phase network, a voltage step-down stage connected to the filtering stage, a voltage step-up stage configured to be connected to the battery and coupled to the voltage step-down stage via an inductive component or an induction coil, and a regulating unit configured to impose chopping duty ratios on the voltage step-down stage and on the voltage step-up stage. The regulating unit compensates for phase shift between an input current of the voltage step-down stage and an input voltage of the voltage step-down stage.

8 Claims, 3 Drawing Sheets

(56) References Cited

U.S. PATENT DOCUMENTS

| | | |
|---|---|---|
| 2007/0153560 A1 | 7/2007 | Zhang et al. |
| 2009/0003021 A1* | 1/2009 | Tsukamoto .................... 363/74 |
| 2010/0213902 A1* | 8/2010 | Oliveira et al. .............. 320/145 |
| 2011/0254494 A1 | 10/2011 | Briane et al. |
| 2012/0286740 A1 | 11/2012 | Loudot et al. |
| 2013/0214729 A1 | 8/2013 | Gati et al. |

* cited by examiner

DEVICE FOR CHARGING A BATTERY OF A MOTOR VEHICLE ON THE BASIS OF A SINGLE-PHASE POWER SUPPLY NETWORK, AND METHOD OF CONTROLLING THE DEVICE

The invention relates to a high-voltage battery charging device, in particular for an electric-traction motor vehicle, on the basis of a single-phase power supply network.

In high-voltage battery recharging systems, the electrical power from the network is delivered to the battery successively via two converters: a voltage step-down or "buck" converter and a voltage step-up or "boost" converter. These two converters enable the voltage ratio between the output and input terminals thereof to be decreased or increased by successively opening and closing a series of switches, at a frequency controlled as a function of the output current and/or the desired output voltage.

Such recharging systems are for example described in patent application FR 2 943 188, which relates to an on-board recharging system for motor vehicles enabling a battery of the vehicle to be recharged from a three-phase or single-phase circuit, the recharging circuit incorporating the coils of an electric machine that also provides other functions such as current generation or vehicle propulsion.

The chopping of the current drawn from the power supply network induces high-frequency components in the current drawn, i.e. harmonics of an order higher than the fundamental frequency of the distribution network, which is conventionally 50 Hz.

As the electricity distributor imposes a standard concerning the harmonics of the current drawn, such a recharge system also includes a resistive/inductive/capacitive (RLC) filter at the input of the voltage step-down converter. This filter induces a phase shift between the current and the voltage drawn from the network. This phase shift results in a reactive power flowing through the network that is not drawn by the user and that should ideally be minimized.

Furthermore, most domestic power supply networks are single-phase power supply networks. A vehicle including a device for recharging a battery from a single-phase power supply can therefore be recharged from a domestic power supply network, for example in a private parking spot or garage.

Recharging from a single-phase power supply network has some specific features. Depending on the topology thereof, it is not always possible to bring the input current into phase with the network voltage. Moreover, when the input sinusoidal voltage is close to zero, the system becomes momentarily uncontrollable, which is not very inconvenient if the storage inductance of the electric machine between the voltage step-down converter and the voltage step-up converter is high, because the current in the inductor does not have time to drop, but has the drawback of this inductor being voluminous.

Furthermore, for the power flow to be continuous, a non-zero current needs to be flowing through the storage inductor of the electric machine between the voltage step-down converter and the voltage step-up converter.

The aim of the invention is to propose a device for controlling the voltage step-down converter and the voltage step-up converter of such a recharging device that enables a reduced phase angle to be maintained between the current and the voltage drawn from the single-phase power supply network, despite the presence of an RLC filter at the device input.

Another aim of the invention is to propose an on-board recharging device for a motor vehicle that can be connected to an external single-phase power supply network and that incorporates the winding of an electric machine of the vehicle in the circuit thereof.

According to one aspect, one embodiment proposes a device for charging a battery, in particular a battery of an electric-traction motor vehicle, from a single-phase power supply network, comprising a filtering stage intended to be connected to the single-phase network, a voltage step-down stage connected to the filtering stage, a voltage step-up stage intended to be connected to the battery and coupled to the voltage step-down stage via an inductive component such as an inductance coil, a control unit able to impose chopping duty cycles on the voltage step-down stage and the voltage step-up stage.

According to a general feature, the control unit includes means for compensating for the phase shift between the input current of the voltage step-down stage and the input voltage of the voltage step-down stage.

Advantageously, the control unit includes a first open-loop control module able to determine a chopping duty cycle of the voltage step-down stage as a function of the voltage of the single-phase power supply network, a setpoint power, and the intensity of the current flowing through the inductance coil, to compensate for the phase shift between the input current of the voltage step-down stage and the input voltage of the voltage step-down stage, and to control the power received by the battery as a function of the setpoint power.

The first control module may advantageously include a map providing the amplitude of the input current of the voltage step-down stage as a function of the amplitude of the input voltage and of the setpoint power.

Preferably, the control unit includes a second control module able to determine a chopping duty cycle of the voltage step-up stage as a function of the voltage at the output of the voltage step-down stage, the voltage of the battery, and the difference between the setpoint induction intensity and the intensity of the current flowing through the inductance coil, providing closed-loop control of the intensity of the current flowing through the battery.

The setpoint induction intensity is preferably always greater than the intensity flowing through the battery, and the intensity flowing through the inductance coil.

Advantageously, the second control module includes a proportional-integral controller to which is sent the difference between the intensity of the current flowing through the inductance coil and the setpoint inductance intensity, and overspeed protection means designed to deactivate the integral part of the controller if the chopping duty cycle determined by the second module is approximately equal to "0" or "1".

According to another aspect, the invention proposes a motor vehicle with at least partial electrical traction including an electric machine coupled to the drive wheels and an inverter stage able to power the electric machine.

According to a general feature, said vehicle includes a device for charging a battery from a single-phase network as described above, the electrical connections and a switch of the voltage step-up stage of said device being included in the inverter stage, and the inductance coil of said device corresponding to the windings of said electric machine.

According to another aspect, one embodiment proposes a method for controlling the charging of a battery, in particular a battery of a motor vehicle, from a single-phase network, in which the input voltage is filtered, the electrical power is taken from the network to the battery via a voltage step-down stage and a voltage step-up stage coupled via an inductive component such as an inductance coil.

According to a general feature, the phase shift between the input current of the voltage step-down stage and the input voltage of the voltage step-down stage is compensated.

Preferably, the input current of the voltage step-down stage is controlled by means of the open-loop control of a chopping duty cycle of the voltage step-down stage as a function of the voltage of the single-phase power supply network, a setpoint power, and the intensity of the current flowing through the inductance coil, to compensate for the phase shift between the input current of the voltage step-down stage and the input voltage of the voltage step-down stage, and to control the power received by the battery as a function of the setpoint power.

The intensity of the current flowing through the battery can also be set to a reference battery intensity by setting, in a closed loop, a chopping duty cycle of the voltage step-up stage as a function of the voltage at the output of the voltage step-down stage, the voltage of the battery, and the difference between the setpoint induction intensity and the intensity of the current flowing through the inductance coil.

The integral part of a proportional-integral controller can advantageously be deactivated if the chopping duty cycle is approximately equal to "0" or "1".

Other advantages and features of the invention are set out in the detailed description of an embodiment of the invention, which is in no way limiting, and the attached drawings, in which:

FIG. 1 shows a schematic view of a device for charging a battery of an electric-traction motor vehicle from a single-phase power supply network, according to one embodiment.

Figure 1:
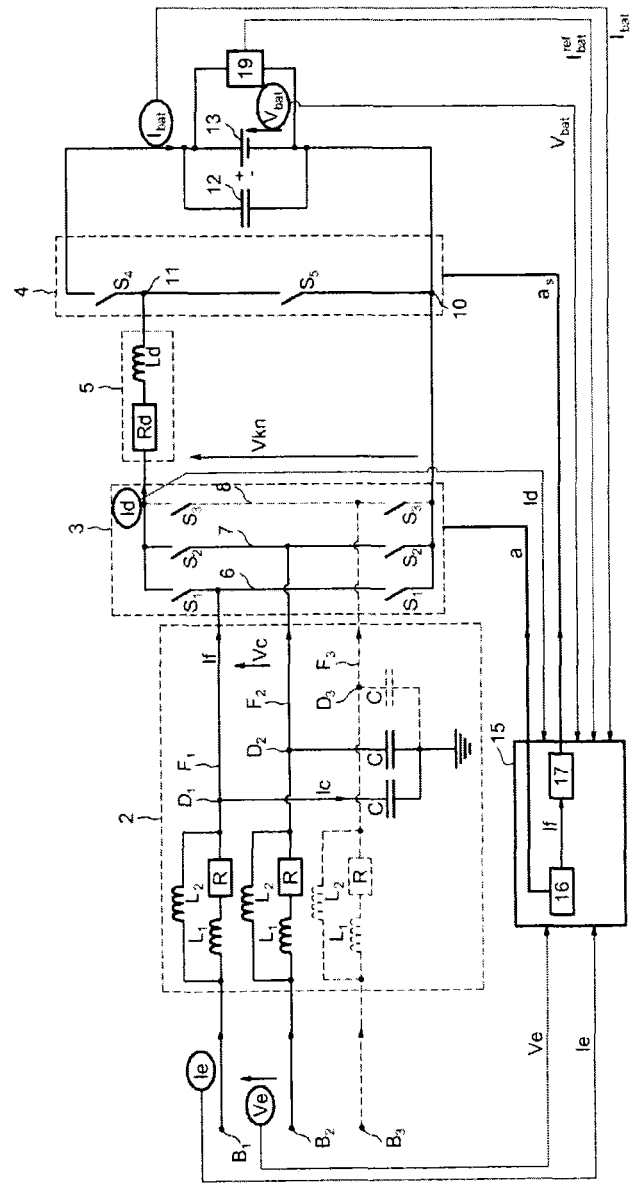
FIG. 1 shows a recharging device according to an embodiment of the invention.

The recharging device 1 includes a filtering stage 2, a voltage step-down stage 3 coupled to the filtering stage 2, and a voltage step-up stage 4 coupled to the voltage step-down stage 3 via an electric machine 5.

Since the device 1 can be coupled to a three-phase or single-phase power supply, it has three terminals $B_1$, $B_2$, $B_3$ coupled to the input of the filtering stage 2, and that can be coupled to a power supply network. In single-phase recharging, only the inputs $B_1$ and $B_2$ are coupled to a single-phase power supply network delivering an input voltage Ve and an input current Ie.

Each input terminal $B_1$, $B_2$ and $B_3$ is coupled to a filtering branch of the filtering stage 2. Each filtering branch includes two branches in parallel, one having an inductor of value $L_2$ and the other having an inductor of value $L_1$ and a resistor of value R in series.

The outputs of these two filtering branches are each coupled to a capacitor of capacitance C also coupled to ground, at a point respectively named $D_1$, $D_2$, $D_3$ for each of the filtering branches. The set of resistors of value R, inductors of value $L_1$ or $L_2$, and capacitors of capacitance C form an RLC filter at the input of the voltage step-down converter 3.

In single phase recharging, terminal $B_3$ is not coupled to the power supply network. Since the filtering branch coupled to terminal $B_3$ is not used, it is not taken into account in the remainder of the description and is shown using dotted lines. The other elements of the electrical circuit shown using dotted lines are elements that are only used when coupling to a three-phase power supply network.

The voltage step-down stage 3 is coupled to the filtering stage 2 at points $D_1$ and $D_2$. When operating with a single-phase power supply, the voltage step-down converter 3 includes two parallel branches 6 and 7, each having two switches $S_1$ or $S_2$ controlled by a control unit 15.

Each input $D_1$ or $D_2$ of the voltage step-down converter is connected, respectively by a branch $F_1$ and $F_2$ to a connection point located between two switches $S_1$ or $S_2$ of a single branch 6 and 7, respectively.

The common extremities of the branches 6 and 7 form two output terminals of the voltage step-down converter 3. One of the terminals is linked to the "−" terminal of the battery 13 and to a first input 10 of a voltage step-up converter 4. The other of these terminals is connected to a first terminal of an electric machine 5, the other terminal of which is connected to a second input 11 of the voltage step-up converter 4.

The voltage step-up converter 4 has two switches $S_4$ and $S_5$ that can be controlled by the control unit 15 independently. These two switches $S_4$ and $S_5$ are located on a branch connecting the first input 10 of the voltage step-up converter 4 and the "+" terminal of the battery 13. The second input 11 of the voltage step-up converter 4, to which the electric machine 5 is connected, is connected between the two switches $S_4$ and $S_5$, the switch $S_4$ being connected between the second input 11 and the "+" terminal of the battery 143, and the switch $S_5$ being coupled between the first input 10 and the second input 11.

An electric machine 5, similar to a resistor of value Rd placed in series with an inductance coil Ld, is connected between the output terminal of the voltage step-down converter 3 and the second input 11 of the voltage step-up converter 4. The electric machine 5 may be replaced by a non-resistive inductance coil or a supplementary inductance coil may be connected in series with the electric machine 5 without moving outside the scope of the invention.

The terminals of the battery 13 are connected to a capacitor 12 intended to keep the voltage at the terminals of the battery 13 relatively stable, and a module 19 for monitoring the charge of the battery that is able to deliver a setpoint value $I_{bat}^{ref}$ determining, as a function of the battery charge level, the optimal current intensity to inject via the "+" terminal of the battery 13. The charge monitoring module 19 sends the setpoint value $I_{bat}^{ref}$ to the control unit 15 over a dedicated connection.

Measurement means, built into the module 19 or otherwise, also send the control unit 15 a value $I_{bat}$ determining a measured current actually entering the battery, and a value $V_{bat}$ determining the voltage between the "−" terminal and the "+" terminal of the battery 13.

Other current intensity measurement modules make it possible to measure and send to the control unit 15 the value Id of the current flowing through the electric machine 5, the intensity Ie of the current of the power supply network entering the filtering stage 2, and the input voltage value Ve of the power supply from the network.

The control unit 15 includes a first control module 16 determining the chopping duty cycle a of the voltage step-down stage 3, and a second control module 17 determining a chopping duty cycle setpoint $a_s$ of the voltage step-up stage 4.

For this, the control unit 15 includes two pilot modules (not shown), the first to impose a temporal opening and closing pattern for each of the switches of the voltage step-down converter 3 such as to obtain the chopping duty cycle a of the voltage step-down stage 3, and the second to impose a temporal opening and closing pattern for each of the switches $S_4$ and $S_5$ of the voltage step-up converter 4 such as to obtain the duty cycle $a_s$.

The switches are preferably transistors enabling rapid switching, for example insulated gate bipolar transistors (IGBT).

When used exclusively in single-phase mode, the switch $S_4$ between the second input 11 of the voltage step-up converter 4 and the "+" terminal of the battery 13 is always closed and may as a result be replaced by a diode enabling a flow from said second input 11 to the "+" terminal of the battery 13. If the device 1 can be coupled to a single-phase power supply network as well as a three-phase power supply network, a diode can be connected in parallel with the switch $S_4$ coupled between said second input 11 and the "+" terminal of the battery 13, the diode enabling a flow from said second input 11 to the "+" terminal of the battery 13.

To assess the duty cycles a and $a_s$, the control unit 15 receives as input the values of the power supply voltage Ve from the network, the intensity Id of the current flowing through the electric machine 5, the voltage $V_{bat}$ across the battery 13, the intensity $I_{bat}$ of the current flowing through the battery 13, and the reference battery intensity $I_{bat}^{ref}$ delivered by the charge monitoring module 19.

By way of example, the characteristic values of the electrical elements of the charging device 1 are within the following ranges:
- the capacitance values of the filter 2 represent several hundred µF, for example between 100 and 500 µF each,
- the capacitance 12 between the terminals of the battery 13 used to stabilize the voltage of the terminals is around mF, for example between 1 and 10 mF,
- the resistance values R of the filtering circuit 2 are around one ohm, for example between 1 and 10 Ω,
- the resistance Rd of the rotor of the electric machine Me is around several tens of mΩ, for example between 0.01 Ω and 0.1 Ω,
- the inductance values L1, L2, Ld corresponding respectively to the inductors of the filtering stage 2 and the winding of the electric machine 5, have values of around several tens of µH, for example between 10 µH and 100 µH.

Using the first control module 16 and the second module 17, the control unit prepares chopping duty cycle setpoint values a and $a_s$ for the voltage step-down converter 3 and for the voltage step-up converter 4, satisfying the following three objectives:
- controlling the amplitude of the input current If of the voltage step-down stage 3 and ensuring that this current If is in phase with the input voltage Ve (this control minimizes the phase shift between the input current If of the voltage step-down stage 3 and the input voltage $V_c$ of the voltage step-down stage 3), thereby controlling the power drawn as a function of the power supply network,
- obtaining a measured input current $I_{bat}$ at the "+" terminal of the battery 13, corresponding to the power supply needs of the battery 13, these needs being determined by the charge monitoring module 19 and delivered as the $I_{bat}^{ref}$ function to the control unit 15,
- preventing elimination of the current Id flowing through the inductance coil Ld of the electric machine 5 so as not to generate unwanted harmonics in the current drawn from the network.

Since the voltage drop in the filtering stage 2 is negligible for the power range used, the equations of the input filter need not be described.

The voltage Vc at the input of the voltage step-down stage 3 is deemed to be equal to the input voltage Ve of the power supply network.

The output voltage Vkn of the voltage step-down stage 3 is a·Ve. As it is equal to a·Ve, the equation of the branch bearing the electric machine 5 can be written in the following form:

$$Rd \cdot Id + Ld \cdot s \cdot Id = a \cdot Ve - a_s \cdot V_{bat} \qquad \text{(equation 1)}$$

where s is the derivative operator in relation to time "t", or $$\frac{d}{dt} = s,$$

a is the chopping duty cycle of the voltage step-down stage 3, $a_s$ the duty cycle of the voltage step-up stage 4.

The chopping duty cycle a of the voltage step-down stage 3 can also be written a=If/Id, where If is the input current in the voltage step-up stage 3, and the chopping duty cycle $a_s$ of the voltage step-up stage 4 is given by $a_s = I_{bat}/Id$.

The equation (1) can therefore also be written in the following form:

$$Rd \cdot Id + Ld \cdot s \cdot Id = (If \cdot Ve - I_{bat} \cdot V_{bat})/Id \qquad \text{(equation 2)}$$

or:

$$Rd \cdot Id^2 + \frac{Ld}{2} \cdot s \cdot Id^2 = If \cdot Ve - I_{bat} \cdot V_{bat} \qquad \text{(equation 3)}$$

According to equation 3, the intensity If of the input current of the voltage step-down stage 3 can therefore be used as a control variable to lock the current Id flowing through the electric machine 5 to a setpoint value $Id^{ref}$ prepared such as to prevent the elimination of the current in the inductance coil Ld.

Figure 4:
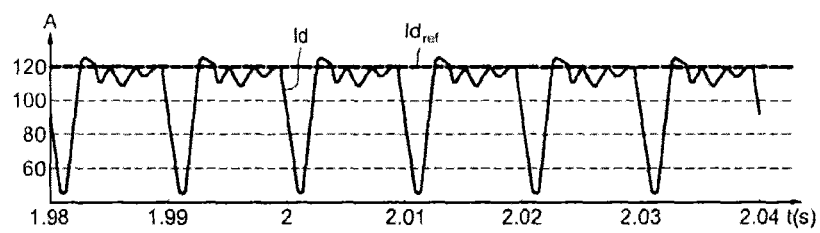
FIG. 4 is a graphical representation of the current flowing through the inductance coil.

If the input voltage Ve approaches zero, the system becomes uncontrollable, even if it is locked. According to the equations, during these uncontrollable phases, the current Id in the coil Ld of the electric machine 5 can only drop, as shown in FIG. 4.

Dividing the value of the intensity If of the input current of the voltage step-down stage 3 by the value of the intensity Id of the current measured through the electric machine 5 by definition gives the value of the chopping duty cycle a of the voltage step-down stage 3. Controlling the voltage step-down stage 3 using the chopping duty cycle setpoint a makes it possible to lock the power supply current Ie of the network to a zero reference, in order to eliminate the phase shift between the current and the voltage at the input of the voltage step-down stage 3, and to lock the current Id flowing through the electric machine 5 to the desired setpoint value, i.e. the setpoint induction intensity $Id^{ref}$.

The input voltage Vc of the voltage step-down stage 3, equal to the input voltage Ve of the power supply network, takes the form Vc=Ve=Vm sin(ωt).

The command guarantees that If is in phase with the input voltage. The input current Ie is given by Ie=If+Ic, i.e. $I_e = I_{fm} \sin(\omega t) + C/2 V_m \cos(\omega t)$.

The current If is therefore an image of the active power taken from the network. This latter is given by the relationship $P_{active} = I_{fm} V_m / 2$, where $I_{fm} = 2 P_{active}/V_m$.

If the input current Ie is controlled by the input current If of the voltage step-down stage 3 to eliminate the phase shift, and the current Id flowing through the electric machine 5 is controlled by the input current If of the voltage step-down stage 3 to prevent elimination of current in the coil Ld of the electric machine 5, then the third objective of the control provided by the control unit 15 relating to locking the input current in the battery $I_{bat}$ to the setpoint value $I_{bat}^{ref}$ delivered by the charge monitoring module 19 remains to be fulfilled.

To do so, a chopping duty cycle $a_s$ can for example be applied to the voltage step-up converter such as to satisfy the relationship $a_s = I_{bat}^{ref}/Id$.

The relationship determining the dynamic of the current through the electric machine 5, given by the equation (1), directly links the duty cycle $a_s$ of the voltage step-up stage 4 and the current Id flowing through the electric machine 5.

It is therefore possible to control $a_s$ directly from the error between the reference value $Id^{ref}$ and the measured value Id flowing through the electric machine 5.

Figure 2A:
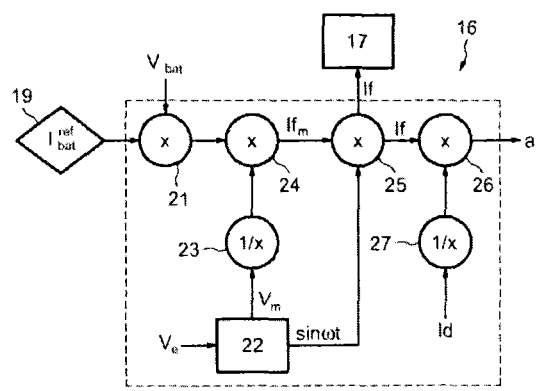
FIGS. 2a and 2b show respectively first and second embodiments of a first control module.

FIG. 2a is a schematic view of a first embodiment of the first control module 16. The first control module includes open-loop control of the input current If of the voltage step-down stage 3. The input current If of the voltage step-down stage 3 is controlled by calculating the chopping duty cycle a of the voltage step-down converter 3.

The chopping duty cycle a of the voltage step-down stage 3 is determined as a function of the setpoint power $P_{bat}^{ref}$, determined from the voltage of the battery $V_{bat}$ and the setpoint battery intensity $I_{batt}^{ref}$, the input voltage Ve of the single-phase power supply network and the intensity Id of the current flowing through the inductance coil Ld.

The first control module 16 receives the battery intensity setpoint $I_{bat}^{ref}$ at a first input and the voltage measured at the terminals of the battery $V_{bat}$ at a second input. The setpoint intensity of the battery $I_{bat}^{ref}$ and the voltage $V_{bat}$ of the battery are inputted to a first multiplier 21 which then outputs the setpoint power $P_{bat}^{ref}$.

At a third input, the control module 16 receives the input voltage Ve from the power supply network. The module 16 includes a signal analyzer 22 enabling the standardized amplitude signal $V_m$ proportional to the input voltage Ve of the single-phase power supply network to be extracted. The amplitude signal $V_m$ is delivered to a first reversing switch 23 that outputs the reverse of the amplitude $V_m$. The reverse $\overline{V}_m$ of this amplitude is delivered to a second multiplier 24 that also receives as an input the setpoint power $P_{bat}^{ref}$.

The second multiplier 24 then outputs the amplitude $If_m$ of the input current of the voltage step-down stage 3 to a third multiplier 25, which also receives as an input the phase signal $\sin(\omega t)$ of the input voltage $V_e$ of the single-phase power supply network.

The third multiplier 25 then outputs the input current If of the output voltage step-down stage 3, firstly to the second control module 17 and secondly to a fourth multiplier 26. The module 16 receives, via a fourth input, the value Id of the intensity of the current flowing through the coil Ld of the electric machine 5. The value Id of the current flowing through the coil Ld is delivered to a second reversing switch 27 that outputs the reverse of the intensity Id of the current flowing through the coil Ld to the fourth multiplier 26.

The fourth multiplier 26 then performs the calculation If/Id and outputs the value of the chopping duty cycle a of the voltage step-down stage 3, enabling the input current If of the voltage step-down stage 3 to be controlled.

Figure 2B:
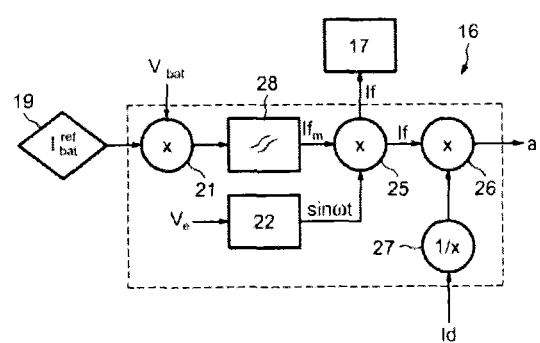

FIG. 2b shows a second embodiment of the first control module 16.

In this module 16, the second multiplier 24 has been replaced by a map 28 delivering the amplitude $If_m$ of the input current If of the voltage step-down stage 3 as a function of the amplitude $V_m$ of the input voltage Ve and of the setpoint power $P_{bat}^{ref}$.

Figure 3:
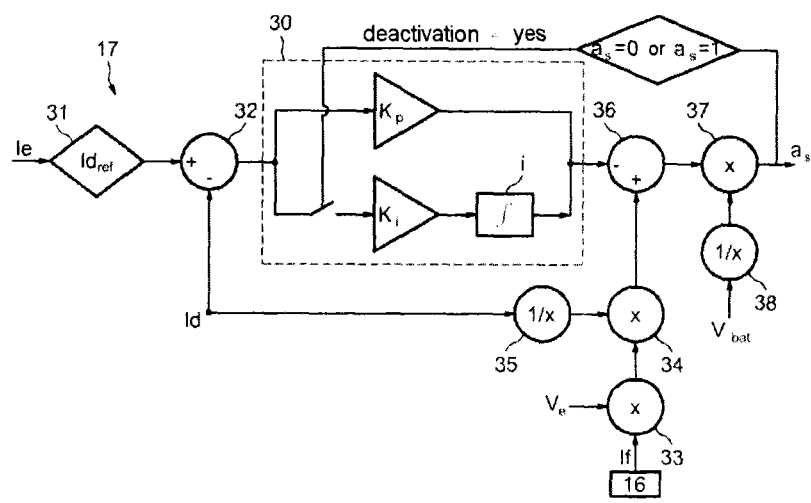
FIG. 3 is a schematic view of an embodiment of a second control module.

FIG. 3 shows an embodiment of the second control module 17.

In the charging device 1, the current $I_{bat}$ flowing through the battery 13 is controlled by the voltage step-up stage 4. Indeed the current $I_{bat}$ of the battery is given by the relationship $I_{bat} = a_s I_d$.

Thus, the current $I_{bat}$ in the battery 13 can simply be locked to the related reference value with $a_s = I_{bat}^{ref}/Id$.

It is also possible to add a correction loop if the current measurement of the battery is available. In this case, the following is obtained:

$$a_s = \frac{1}{Id} \cdot \left[ I_{bat}^{ref} + \alpha \cdot \left( I_{batt}^{ref} - I_{bat} \right) \right] \quad \text{(equation 4)}$$

where $\alpha$ is a setting parameter.

The second control module 17 includes closed-loop control of the intensity Id of the current flowing through the inductance coil Ld of the electric machine 5.

The second control module 17 receives, at a first input, a value Ie of the input intensity of the power supply network. This intensity value Ie is delivered to a module 31 determining the value of the setpoint induction intensity $Id^{ref}$. The second control module 17 receives, at a second input, the value Id of the intensity of the current flowing through the coil Ld of the electric machine 5. The value Id of the intensity is delivered to a negative input of a first subtracter 32 that receives at a positive input the value $Id^{ref}$ of the setpoint induction intensity.

The first subtracter 32 then outputs the difference between the intensity Id of the current flowing through the inductance coil Ld and the setpoint inductance intensity $I_d^{ref}$ to a proportional/integral controller 30.

The proportional/integral controller 30 includes two branches in parallel, the first of which includes a proportional control module $K_p$ and the second includes an integral control module $K_i$ and an integration module i.

The second control module 17 receives, at a third input, the value If of the intensity of the input current of the voltage step-down stage 3 delivered by the first control module 16. The intensity If is delivered to a first multiplier 33, which also receives as input the input voltage $V_e$ of the single-phase network received at a fourth input of the second control module 17.

The first multiplier 33 thus outputs a value $P_{active}$ of the active power. This value $P_{active}$ is inputted to a second multiplier 34 that also receives as input the reverse of the current Id, the current Id having previously been delivered to a first reversing switch 35.

The second multiplier 34 performs the calculation $P_{active}/Id$ and outputs a value Vkn of the output voltage of the voltage step-down stage 3. The voltage Vkn of the voltage step-down stage 3 is delivered to a positive input of a second subtracter 36 that receives on a negative input the output from the proportional/integral controller 30.

The second subtracter 36 then outputs the sum of the difference between the intensity Id of the current flowing through the inductance coil Ld and the setpoint inductance intensity $I_d^{ref}$ corrected by the proportional/integral controller 30, with the output voltage Vkn of the voltage step-down stage 3 at the input of a third multiplier 37. The third multiplier 37 also receives as input the reverse of the battery voltage $V_{bat}$, the battery voltage $V_{bat}$ having been received at a fifth input of the second control module 17 and delivered in advance to a second reversing switch 38.

The third multiplier 37 then outputs the setpoint value of the chopping duty cycle $a_s$ of the voltage step-up stage 4.

The second control module 17 also includes a feedback loop between the output of the third multiplier 37 and the input of the branch of the proportional/integral controller 30 containing the integral control module $K_i$.

If the value of the chopping duty cycle $a_s$ of the voltage step-up stage 4 is approximately 0 or 1, the integral control branch is deactivated.

This feedback loop is an overspeed protection technique used to overcome the loss of control of the device when the input voltage Ve approaches zero. Indeed during uncontrollable phases, control is saturated, i.e. the duty cycles of the switches, or IGBT transistors, are at 1, as it is not able to reduce the difference. To prevent this error from continuing to be integrated, the feedback loop is used. Accordingly, once the device can be controlled, the current Id flowing through the coil Ld of the electric machine 5 is brought to the reference value $Id^{ref}$.

The use of this feedback loop also makes it possible to control a system that has a very-low-inductance coil Ld. The use of a low-inductance coil makes it possible to reduce the volume of the charger.

The invention provides an on-board charging device for a motor vehicle designed to be connected to an external single-phase power supply network, incorporating within its circuit the winding of an electric machine of the vehicle, and making it possible to control the voltage step-down converter and the voltage step-up converter such as to maintain a reduced phase shift between the current and the voltage drawn from the single-phase power supply network.

The invention claimed is:

1. A device for charging a battery, or charging a battery of an electric-traction motor vehicle, from a single-phase power supply network, the device comprising:
    a filtering stage configured to be connected to the single-phase network;
    a voltage step-down stage connected to the filtering stage;
    a voltage step-up stage configured to be connected to the battery and coupled to the voltage step-down stage via an inductive component or an inductance coil; and
    control circuitry configured to impose chopping duty cycles on the voltage step-down stage and the voltage step-up stage,
    wherein the control circuitry is further configured to compensate for a phase shift between an input current of the voltage step-down stage and an input voltage of the voltage step-down stage,
    wherein the control circuitry is further configured to determine a chopping duty cycle of the voltage step-down stage as a function of a voltage of the single-phase power supply network, a setpoint power, and an intensity of current flowing through the inductive component, to compensate for the phase shift between the input current of the voltage step-down stage and the input voltage of the voltage step-down stage, and to control power received by the battery as a function of the setpoint power, and
    wherein the control circuitry is further configured to determine a chopping duty cycle of the voltage step-up stage as a function of a voltage at an output of the voltage step-down stage, a voltage of the battery, and a difference between the setpoint induction intensity and the intensity of the current flowing through the inductive component, providing closed-loop control of an intensity of a current flowing through the battery.

2. The device as claimed in claim 1, wherein the control circuitry further includes a map providing an amplitude of the input current of the voltage step-down stage as a function of an amplitude of the input voltage and of the setpoint power.

3. The device as claimed in claim 1, wherein the setpoint induction intensity is always greater than the intensity flowing through the battery and the intensity flowing through the inductive component.

4. The device as claimed in claim 1, wherein the control circuitry receives the difference between the intensity of the current flowing through the inductive component and the setpoint inductance intensity, and is further configured to deactivate the integral part of the controller if the chopping duty cycle determined by the second module is approximately equal to "0" or "1".

5. A motor vehicle with at least partial electrical traction, comprising:
    an electric machine coupled to drive wheels and an inverter stage configured to power the electric machine;
    a device as claimed in claim 1;
    electrical connections and a switch of the voltage step-up stage of the device being included in the inverter stage, and the inductive component of the device being windings of the electric machine.

6. The device as claimed in claim 1, wherein the control circuitry is connected to the voltage step-down stage and to the voltage step-up stage.

7. A method for controlling charging of a battery, or a battery of a motor vehicle, from a single-phase network, in which an input voltage is filtered, electrical power is taken from a network to the battery via a voltage step-down stage and a voltage step-up stage coupled via an inductive component or an inductance coil, the method comprising:
    compensating for a phase shift between an input current of the voltage step-down stage and an input voltage of the voltage step-down stage;
    controlling the input current of the voltage step-down stage via an open-loop control of a chopping duty cycle of the voltage step-down stage as a function of a voltage of the single-phase power supply network, a setpoint power, and an intensity of the current flowing through the inductive component, compensating for the phase shift between the input current of the voltage step-down stage and the input voltage of the voltage step-down stage, and controlling power received by the battery as a function of the setpoint power; and
    locking an intensity of a current flowing through the battery to a reference battery intensity via a closed-loop control of a chopping duty cycle of the voltage step-up stage as a function of a voltage at an output of the voltage step-down stage, a voltage of the battery, and a difference between a setpoint induction intensity and an intensity of the current flowing through the inductive component.

8. The method as claimed in claim 7, wherein an integral part of a proportional-integral controller is deactivated if the chopping duty cycle is approximately equal to 0 or 1.

* * * * *